(12) United States Patent
Sanfilippo et al.

(10) Patent No.: US 8,140,464 B2
(45) Date of Patent: Mar. 20, 2012

(54) HYPOTHESIS ANALYSIS METHODS, HYPOTHESIS ANALYSIS DEVICES, AND ARTICLES OF MANUFACTURE

(75) Inventors: Antonio P. Sanfilippo, Richland, WA (US); Andrew J. Cowell, Kennewick, WA (US); Michelle L. Gregory, Richland, WA (US); Robert L. Baddeley, Richland, WA (US); Patrick R. Paulson, Pasco, WA (US); Stephen C. Tratz, Richland, WA (US); Ryan E. Hohimer, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 949 days.

(21) Appl. No.: 11/414,069

(22) Filed: Apr. 28, 2006

(65) Prior Publication Data

US 2007/0255666 A1    Nov. 1, 2007

(51) Int. Cl.
- G06F 9/44 (2006.01)
- G06F 17/00 (2006.01)
- G06N 7/02 (2006.01)
- G06N 7/06 (2006.01)
- G06N 5/02 (2006.01)

(52) U.S. Cl. .............................. 706/52; 706/46; 706/911
(58) Field of Classification Search .................... 706/12, 706/45–46, 52, 911
See application file for complete search history.

(56) References Cited

U.S. PATENT DOCUMENTS

| | | | |
|---|---|---|---|
| 4,649,515 A * | 3/1987 | Thompson et al. ........... | 706/911 |
| 5,159,667 A * | 10/1992 | Borrey et al. ................. | 706/900 |
| 6,044,373 A * | 3/2000 | Gladney et al. ....................... | 1/1 |
| 6,484,168 B1 | 11/2002 | Pennock et al. | |
| 7,525,484 B2 * | 4/2009 | Dupray et al. ................ | 342/450 |
| 7,917,460 B2 * | 3/2011 | Talbot et al. ..................... | 706/59 |
| 2002/0198866 A1 * | 12/2002 | Kraft et al. .......................... | 707/3 |
| 2003/0140020 A1 * | 7/2003 | Chen et al. ...................... | 706/15 |
| 2004/0267566 A1 * | 12/2004 | Badgett et al. .................... | 707/3 |
| 2006/0004683 A1 * | 1/2006 | Talbot et al. .................... | 706/52 |
| 2006/0093208 A1 * | 5/2006 | Li et al. .......................... | 382/159 |
| 2006/0112045 A1 * | 5/2006 | Talbot et al. .................... | 706/46 |
| 2006/0294035 A1 * | 12/2006 | Siegel et al. .................... | 706/45 |
| 2007/0005520 A1 * | 1/2007 | Eick et al. ........................ | 706/12 |
| 2007/0005523 A1 * | 1/2007 | Maren ............................. | 706/14 |
| 2007/0011134 A1 * | 1/2007 | Langseth et al. .................. | 707/1 |
| 2007/0106493 A1 | 5/2007 | Sanfilippo et al. | |
| 2007/0147262 A1 * | 6/2007 | Aaron et al. .................. | 370/250 |
| 2007/0250644 A1 * | 10/2007 | Lund et al. .................... | 709/245 |

OTHER PUBLICATIONS

Talbot, P. "Semantic Networks: A Unifying Framework for Multistrategy Reasoning" Technology Review Journal, Spring/Summer 2003.*

Pike, W.A. "Modeling Drinking Water Quality Violations with Bayesian Networks" Journal of the American Water Resources Association, Dec. 2004.*

(Continued)

*Primary Examiner* — Jeffrey A Gaffin
*Assistant Examiner* — Benjamin Buss
(74) *Attorney, Agent, or Firm* — Wells St. John, P.S.

(57) ABSTRACT

Hypothesis analysis methods, hypothesis analysis devices, and articles of manufacture are described according to some aspects. In one aspect, a hypothesis analysis method includes providing a hypothesis, providing an indicator which at least one of supports and refutes the hypothesis, using the indicator, associating evidence with the hypothesis, weighting the association of the evidence with the hypothesis, and using the weighting, providing information regarding the accuracy of the hypothesis.

30 Claims, 9 Drawing Sheets

OTHER PUBLICATIONS

Dutta, S.K. et al. "A Bayesian Perspective on the Strength of Evidence in Auditing" Indian Journal of Accounting, vol. XXVII, Jun. 1996.*
Talbot, P.J. "Semantic Networks: A Unifying Framework for Multistrategy Reasoning" Technology Review Journal, Spring/Summer 2003.*
"GATE—General Architecture for Text Engineering"; http://gate.ac.uk/; Apr. 27, 2006; 1 page.
"Cicero Lite"; http://www.languagecomputer.com/solutions/information_extraction/cicero_lite; Apr. 19, 2006; 2 pp.
"Connexor natural Knowledge"; www.connexor.com; 2003; 2 pp.
U.S. Appl. No. 11/267,370, filed Nov. 5, 2005; "Methods of Defining Ontologies, Word Disambiguation Methods, Computer Systems, and Articles of Manufacture"; Sanfilippo et al; 38 pp.
"Likert Scale"; http://en.wikipedia.org/wiki/Likert_Scale; Apr. 26, 2006; 2 pp.
"Advances in the Dempster-Shafer Theory of Evidence"; 1994; Yager et al. ; 604 pps.
"Knowledge Management in the Intelligence Enterprise"; 2003; Waltz, E.; pp. 159-235.
"The Evidential Foundations of Probabilistic Reasoning"; 2001; Schum et al.; pp. 169-192.
"The Evidential Foundations of Probabilistic Reasoning"; 2001; Schum et al.; pp. 222-238.
"The Art of Long View: Planning for the Future in an Uncertain World"; 1996; Schwartz , P.; pp. 241-248.
"ACH0: A Tool for Analyzing Competing Hypotheses"; Heuer et al.; Oct. 13, 2004; pp. 1-10.
"A Dempster-Shafer Approach to Diagnosing Hirearchical Hypotheses"; May 1989; Yen et al.; pp. 573-585.
"The Penn Discourse Treebank"; Miltsakaki et al.; 2004; 4 pp.
"Rhetorical Structure Theory: Toward a Functional Theory of Text Organization"; 1988; Mann et al.; pp. 243-281.
"Automating Ontological Annotation with WordNet"; Jan. 19, 2006; Sanfilippo et al.; pp. 85-93.
"A Technique for the Measurement of Attitudes"; 1932; Likert, R.A.; pp. 5-55.
"A Layered Dempster-Shafer Approach to Scenario Construction and Analysis"; Sanfilippo et al.; May 2007; pp. 1-8.
"Perspectives on the theory and practice of belief functions"; Shafer, Glenn; 1990; International Journal of Approximate Reasoning 3; pp. 1-27.
"Knowledge Associates for Novel Intelligence (KANI)"; 2005; Fikes et al.; 2 pp.
"Upper and Lower Probabilities Induced by a Multivalued Mapping"; 1967; Dempster, A.; pp. 325-339.
"Psychology of Intelligence Analysis: Center for the Study of Intelligence"; 1999; Heuer et al.; 206 pp.
"Bayesian Networks Implementation of the Dempster Shafer Theory to Model Reliability Uncertainty"; Apr. 20, 2006; Simon et al.; 6 pp.
"On the Dempster-Shafer Framework and New Combination Rules"; 1987; Yager, R.; pp. 93-137.
"A generalization of Bayesian inference"; Dempster, A.P.; 1968; Journal of the Royal Statistical Society, Series B 30; pp. 73-103.

* cited by examiner

HYPOTHESIS ANALYSIS METHODS, HYPOTHESIS ANALYSIS DEVICES, AND ARTICLES OF MANUFACTURE

GOVERNMENT RIGHTS STATEMENT

This invention was made with Government support under Contract DE-AC0676RLO1830 awarded by the U.S. Department of Energy. The Government has certain rights in the invention.

TECHNICAL FIELD

This invention relates to hypothesis analysis methods, hypothesis analysis devices, and articles of manufacture.

BACKGROUND

Collection, integration and analysis of large quantities of data are routinely performed by intelligence analysts and other entities. Vast numbers of different types of communications (e.g., documents, electronic mail, etc.) may be analyzed and perhaps associated with one another in an attempt to gain information or insight which is not readily comprehensible from the communications taken individually. During analysis, it may be desired to process communications in attempts to generate, identify, and investigate hypotheses. At least some aspects of the present disclosure are directed towards apparatus and methods configured to assist with intelligence analysis including analysis of hypotheses.

BRIEF DESCRIPTION OF THE DRAWINGS

Preferred embodiments of the invention are described below with reference to the following accompanying drawings.

FIG. 7 is an illustrative representation of a screen display illustrating hierarchies of hypotheses according to one embodiment.

FIG. 9 is an illustrative representation of a weighting of evidence with respect to an indicator according to one embodiment.

DETAILED DESCRIPTION

According to one aspect of the disclosure, a hypothesis analysis method comprises providing a hypothesis, providing an indicator which at least one of supports and refutes the hypothesis, using the indicator, associating evidence with the hypothesis, weighting the association of the evidence with the hypothesis, and using the weighting, providing information regarding the accuracy of the hypothesis.

According to another aspect of the disclosure, a hypothesis analysis method comprises providing an indicator which at least one of supports and refutes a hypothesis, associating the indicator with the hypothesis, providing evidence which at least one of supports and refutes the indicator, associating the evidence with the indicator, and providing information regarding the accuracy of the hypothesis using the association of the indicator with the hypothesis and the association of the evidence with the indicator.

According to an additional aspect of the disclosure, a hypothesis analysis method comprises providing a hypothesis, selecting a subset of a plurality of documents, generating structured representations of the selected subset of the documents, using the structured representations, identifying evidence relative to the hypothesis, and associating the evidence with the hypothesis after the identifying.

According to yet another aspect of the disclosure, a hypothesis analysis device comprises a user interface configured to receive user input from a user and to communicate information to the user and processing circuitry coupled with the user interface and wherein the processing circuitry is configured to control the user interface to communicate information regarding a hypothesis to the user, to associate evidence with the hypothesis, to analyze the association of the evidence with the hypothesis, to provide information regarding the accuracy of the hypothesis responsive to the analysis, and to control communication of the information regarding the accuracy of the hypothesis to the user.

According to still another aspect of the disclosure, an article of manufacture comprises media comprising programming configured to cause processing circuitry to perform processing comprising controlling a display of a hypothesis, first selecting a subset of documents from a larger set of documents, second selecting evidence using one of the documents of the subset after first selecting, associating the evidence with hypothesis after second selecting, and providing information regarding the accuracy of the hypothesis using the association of the evidence with the hypothesis.

An exemplary embodiment discussed below is directed towards analysis of one or more hypotheses. According to one aspect, one or more hypotheses may be formulated and evidence supporting or refuting a hypothesis may be associated with the hypothesis. According to another aspect, hypotheses are analyzed and information may be provided regarding an accuracy of one or more hypotheses. Additional details are disclosed as is apparent from the following discussion.

Figure 1:
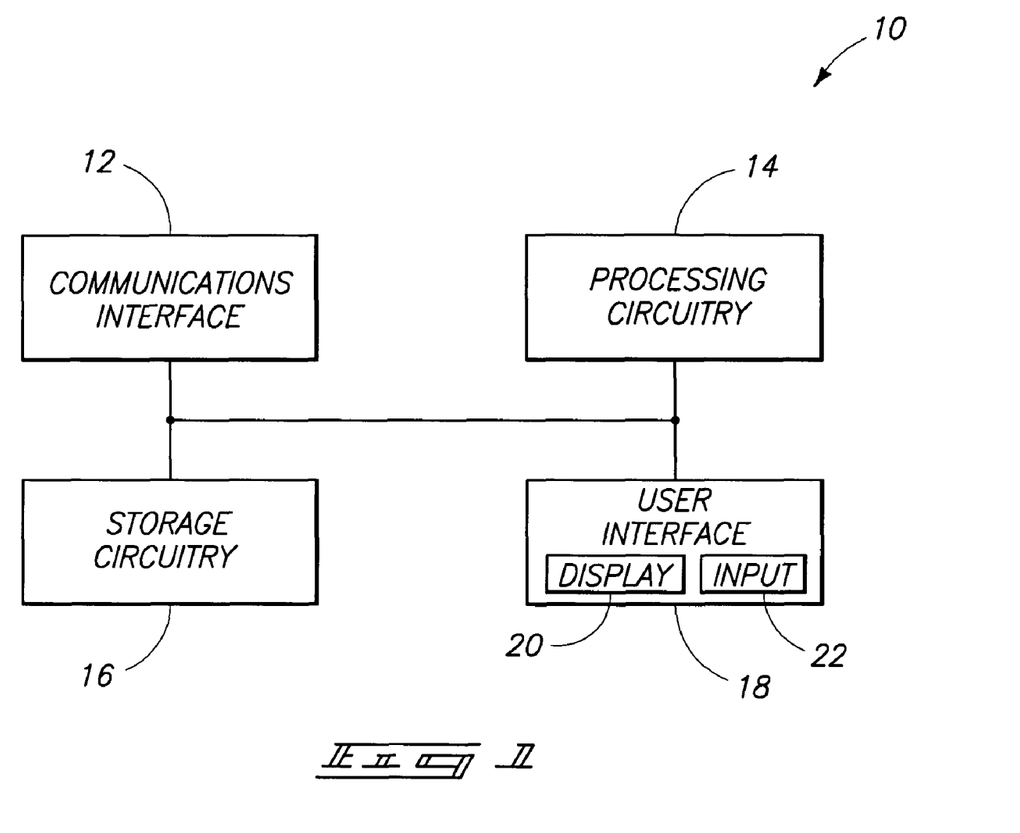
FIG. 1 is a functional block diagram of a hypothesis analysis device according to one embodiment.

Referring to FIG. 1, an exemplary hypothesis analysis device is illustrated with respect to reference 10. Hypothesis analysis device 10 may be implemented as a computing device, such as a personal computer or workstation, in one exemplary embodiment. In the depicted embodiment configured as a computing device, hypothesis analysis device 10 includes a communications interface 12, processing circuitry 14, storage circuitry 16 and a user interface 18. Other embodiments are possible including more, less and/or alternative components.

Communications interface 12 is arranged to implement communications of device 10 with respect to external devices not shown. For example, communications interface 12 may be arranged to communicate information bi-directionally with respect to device 10. Communications interface 12 may be implemented as a network interface card (NIC), serial or parallel connection, USB port, Firewire interface, flash memory interface, floppy disk drive, or any other suitable arrangement for communicating with respect to device 10.

In one embodiment, processing circuitry 14 is arranged to process data, control data access and storage, issue commands, and control other desired operations. Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

The storage circuitry 16 is configured to store programming such as executable code or instructions (e.g., software and/or firmware), electronic data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry 14 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 16 described above and/or communicated via a network or other transmission media and configured to control appropriate processing circuitry 14. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

User interface 18 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface 18 may include a display 20 configured to depict visual information as well as a keyboard, mouse and/or other input device 22. Any other suitable apparatus for interacting with a user may also be utilized.

Figure 2:
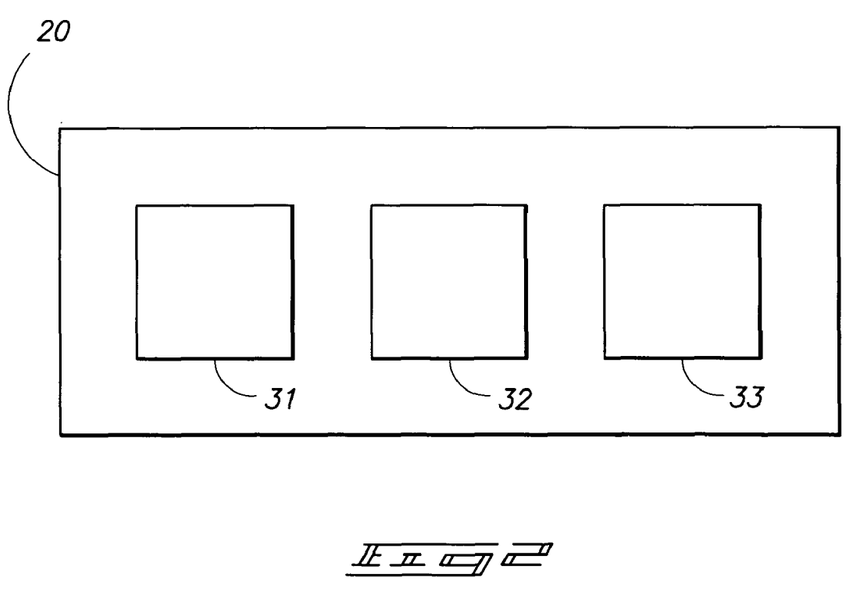
FIG. 2 is a functional block diagram of a display according to one embodiment.

Referring to FIG. 2, one embodiment of display 20 of user interface 18 is shown. Display 20 includes a plurality of display screens 31-33. Processing circuitry 14 may control display screens 31-33 to simultaneously depict various information during formulation and/or analysis of hypotheses according to one embodiment. Display screens 31-33 may correspond to separate monitors in one exemplary embodiment or to a plurality of windows of a single monitor in another exemplary embodiment. For example, in one implementation as described in further detail below, display screen 31 may be used to gather information and explore information at a high level which may support or refute a hypothesis. Display screen 32 may be used by a user to interact with information in a more specific manner. Display screen 33 may be used to construct a hypothesis and associate evidence with the hypothesis perhaps which was uncovered using display screens 31 and 32. A user may simultaneously interact with the plural display screens 31-33 and the analysis may evolve in real time as a user uncovers new evidence and associates evidence uncovered using display screens 31-32 with hypotheses of display screen 33. Utilization of plural display screens 31-33 enables a user to switch between tasks efficiently and easily in any environment. In other embodiments, different configurations of user interface 18, such as a single display screen, are used to implement hypothesis analysis operations discussed below.

Figure 3:
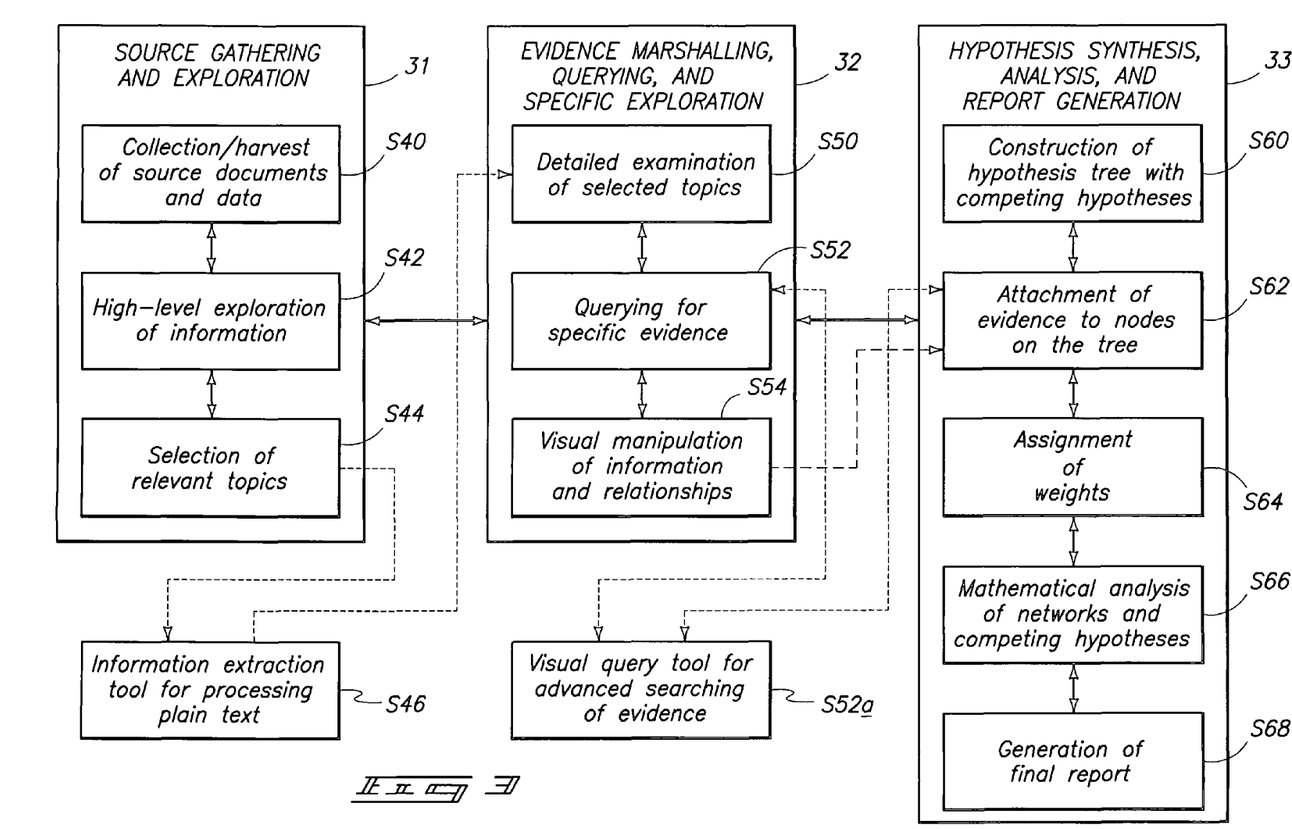
FIG. 3 is an illustrative representation of hypothesis processing according to one embodiment.

Referring to FIG. 3, additional exemplary details of information conveyed using display screens 31-33 are described according to one implementation with respect to formulation and analysis of a hypothesis. The illustrated functionality and description is described according to one embodiment. As illustrated by the double ended arrows, a user may switch back and forth between display screens 31-33 and/or different processing steps of respective display screens 31-33 during analysis operations. In addition, other hypothesis processing embodiments may include more, less and/or alternative functions.

Display screen 31 may be used to implement high level interaction of a user with data to be analyzed. For example, the user may gather and explore information with respect to the formulation of a hypothesis to be analyzed and/or to identify information for further exploration with respect to a given hypothesis.

In the depicted example, a user may collect or harvest a dataset which may include a plurality of source documents at a step S40. Documents may include any information which may be useful to an analyst. Documents may include published articles (e.g., newspapers, magazines, etc.), correspondence (e.g., email, letters, instant messages, transcribed speeches, etc.), photographs, video, or any other information which may be used to formulate, support or refute a hypothesis. In one example, a user may utilize a search engine (e.g., Google) to identify a collection of documents for study. In another example, a database of information may be accessed in an attempt to identify a collection of documents. Other methods are possible to locate the collection of documents to be analyzed.

At a step S42, a user may implement high-level exploration of information. In one embodiment, the user interacts with the set of documents determined at step S40 during the processing of step S42 in an attempt to identify relevant evidence with respect to a hypothesis. In one example, a clustering method described in U.S. Pat. No. 6,484,168 to Pennock et al., the teachings of which are incorporated herein by reference, may be used by an analyst to manipulate and interact with a dataset during processing of step S42. In one embodiment, the method of the '168 patent may be used to provide documents of the dataset of step S40 into subsets such as clusters. For example, the method of the '168 patent may cluster documents related to similar topics in common subsets.

At a step S44, a user may identify a subset of the dataset of step S40 for further investigation. For example, if the method of the '168 patent has provided clustered results at step S42, a user may select one of the clusters and the documents thereof for further analysis. Other methods are possible for interacting with and selecting desired documents during hypothesis analysis.

At a step S46, processing circuitry 14 may operate to process a subset of data selected by the user at step S44 for use with respect to analysis of a hypothesis. In one embodiment, processing circuitry 14 may process the data to facilitate the use of the data in subsequent operations with respect to analysis of a hypothesis. For example, the processing circuitry 14 may access the documents in plain text form and convert the plain text of the documents to a structured form to facilitate the analysis in one embodiment. Additional details of one embodiment of the processing performed at step S46 are described below with respect to FIG. 4 in one embodiment where the processing circuitry 14 generates structured representations in the form of link node graphs comprising triples. Individual triples may include a subject, predicate and object in graphical form and as obtained from plain text sentences of the subsets of documents selected in step S44. The processing circuitry 14 may add Ontology Web Language (OWL) annotations or statements to provide the selected data in a structured form in one embodiment. The display screen 31 may continue to illustrate information regarding the subset of data, the original dataset or other information after the selection of a subset of data by the user and during subsequent processing operations thereof which are described below.

Figure 4:
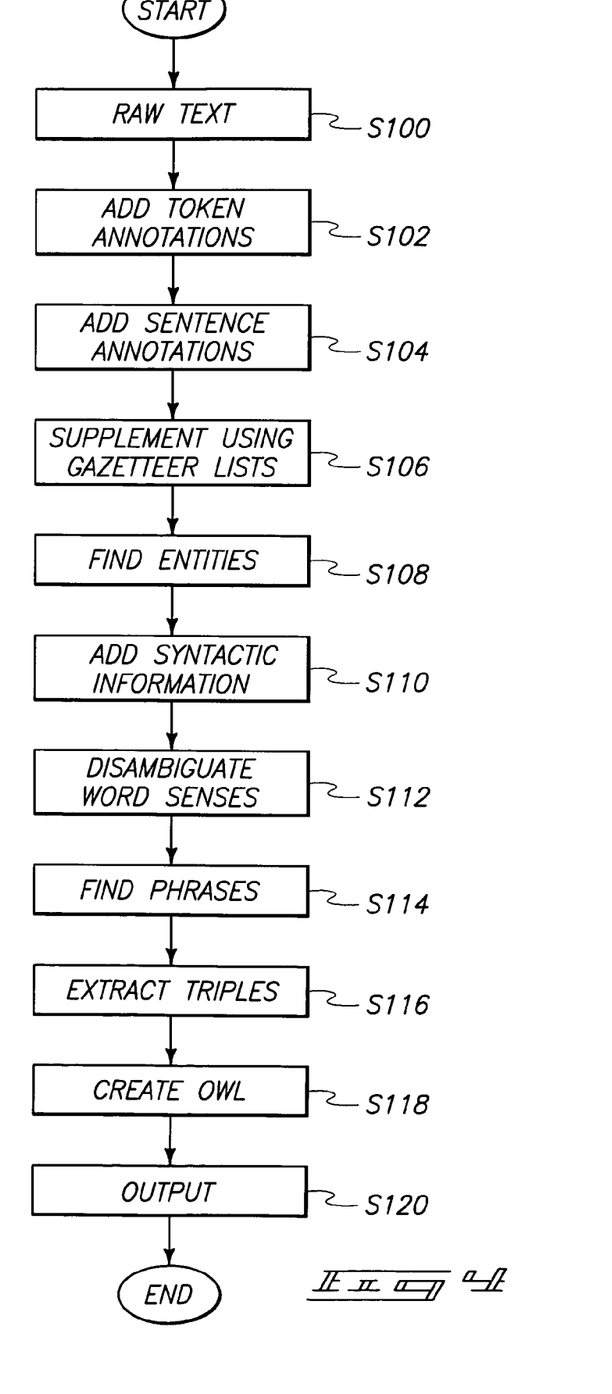
FIG. 4 is a flow chart of an exemplary method for processing plain text to provide structured text according to one embodiment.

Referring to FIG. 4, exemplary processing by processing circuitry 14 to generate structured (e.g., OWL annotated) text from plain text is described. Other methods including more, less or alternative steps are possible in other embodiments.

At a step S100, raw or plain text of a subset of data selected by a user is accessed.

At a step S102, token annotations may be added to the accessed text. In one embodiment, a tokenizer of GATE open source software developed by Sheffield University, U.K., http://gate.ac.uk/ incorporated herein by reference may be used to add token annotations.

At a step S104, a sentence splitter of GATE may be used to add sentence annotations.

At a step S106, GATE uses rules and gazetteer lists to find people, locations, organizations, dates and other named entities.

At a step S108, Cicero Lite described at http://www.languagecomputer.com/solutions/information_extraction/cicero_lite, the teachings of which are incorporated herein by reference, may be used to find additional named entities.

At a step S110, a parser, such as Connexor described at www.connexor.com, the teachings of which are incorporated herein by reference, may be used to add syntactic information to tokens.

At a step S112, word sense disambiguation may be performed in an effort to reduce or remove disambiguities between word senses. An exemplary disambiguation method is described in a U.S. patent application Ser. No. 11/267,370 which was filed Nov. 4, 2005, entitled "Methods Of Defining Ontologies, Word Disambiguation Methods, Computer Systems, And Articles Of Manufacture", listing Antonio Sanfilippo, Stephen Tratz, Michelle L. Gregory, Alan R. Chappell, Paul D. Whitney, Christian Posse, Robert Baddeley, and Ryan Hohimer as inventors, assigned to the assignee hereof, and the teachings of which are incorporated herein by reference.

At a step S114, noun phrases, verb phrases, verbal chunks, etc. and relationships thereof are found. In one embodiment, the analysis may use regular grammar patterns as implemented in a Jape environment of GATE.

At a step S116, structured representations, such as link node graphs in the form of triples in one embodiment, may be extracted. The link node graphs may be generated using the syntactic information of step S110 and the identified text portions of interest of step S114 in one embodiment.

At a step S118, the structured representations are accessed and translated to provide OWL Web Ontology Language annotations.

At a step S120, annotated OWL files may be outputted and the structured representations may be displayed for example using display screen 32.

Figure 5:
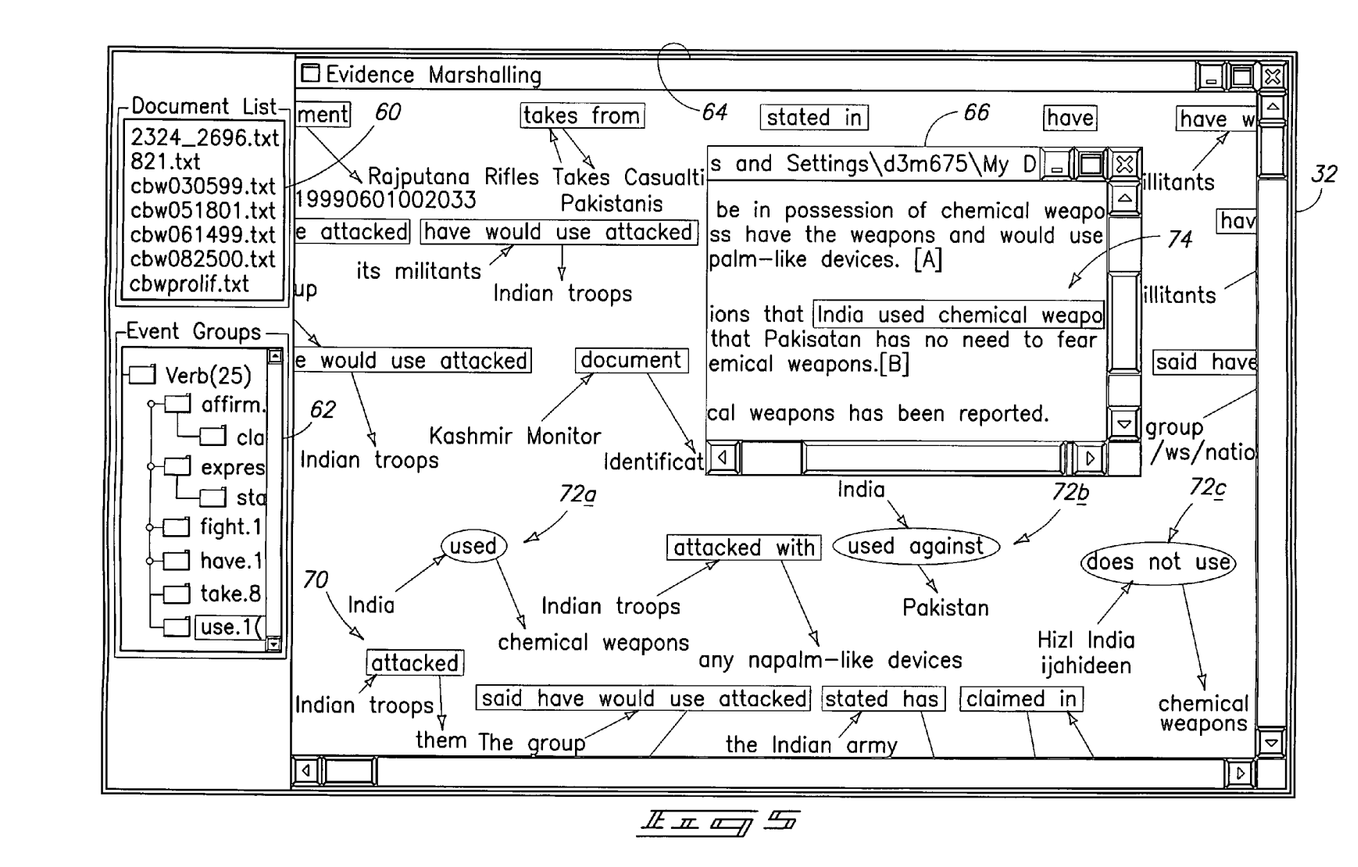
FIG. 5 is an illustrative representation of a screen display illustrating a plurality of structured representations of plain text according to one embodiment.

Referring again to FIG. 3, at a step S50, a selected subset of data may be analyzed. In the described example, the selected subset of data which has been processed from plain text to structured text may be analyzed. Referring to FIG. 5, an exemplary shot of screen display 32 corresponding to step S50 is shown. In FIG. 5, screen display 32 may include a plurality of windows including a document list window 60 which illustrates the documents of a subset which were selected by a user, an event group window 62 including the selected documents grouped by additional subsets corresponding to events present in the documents, an evidence marshalling window 64 where a user may interact with structural representations of documents, and a document window 66 which may include the contents of a document selected by a user.

Selected documents or portions of selected documents may be displayed as a plurality of structured representations 70 in FIG. 5. The structured representations 70 are provided in the form of triples individually including a subject, predicate and object in the illustrated arrangement.

The user interacting with the evidence marshalling window 64 may examine the selected data in detail discovering relationships, filtering or removing unwanted data, searching for data, and/or looking at original source data. For example, the user may select a node of one of the structured representations 70 and processing circuitry 14 can form document window 66 depicting the contents of the original document corresponding to the selected node so the user can view the context of the selected node.

A user may use event group window 62 to interact with the displayed data. Event group window 62 may include a hierarchy of ontology events or topics of the documents arranged in a plurality of groups. In the example of FIG. 5, a user has selected events with the sense "use" and is viewing the context of a particular event within document window 66. For example, structured representations 72a, 72b, 72c which include the selected sense "use" are highlighted and the document window 66 includes contents of the document which corresponds to structured representation 72a. A highlighted portion 74 of a sentence of the document corresponding to the structured representation 72a selected by a user may be provided to assist the user with reviewing the text of the structured representation 72a with respect to other portions of the respective document.

Figure 6:
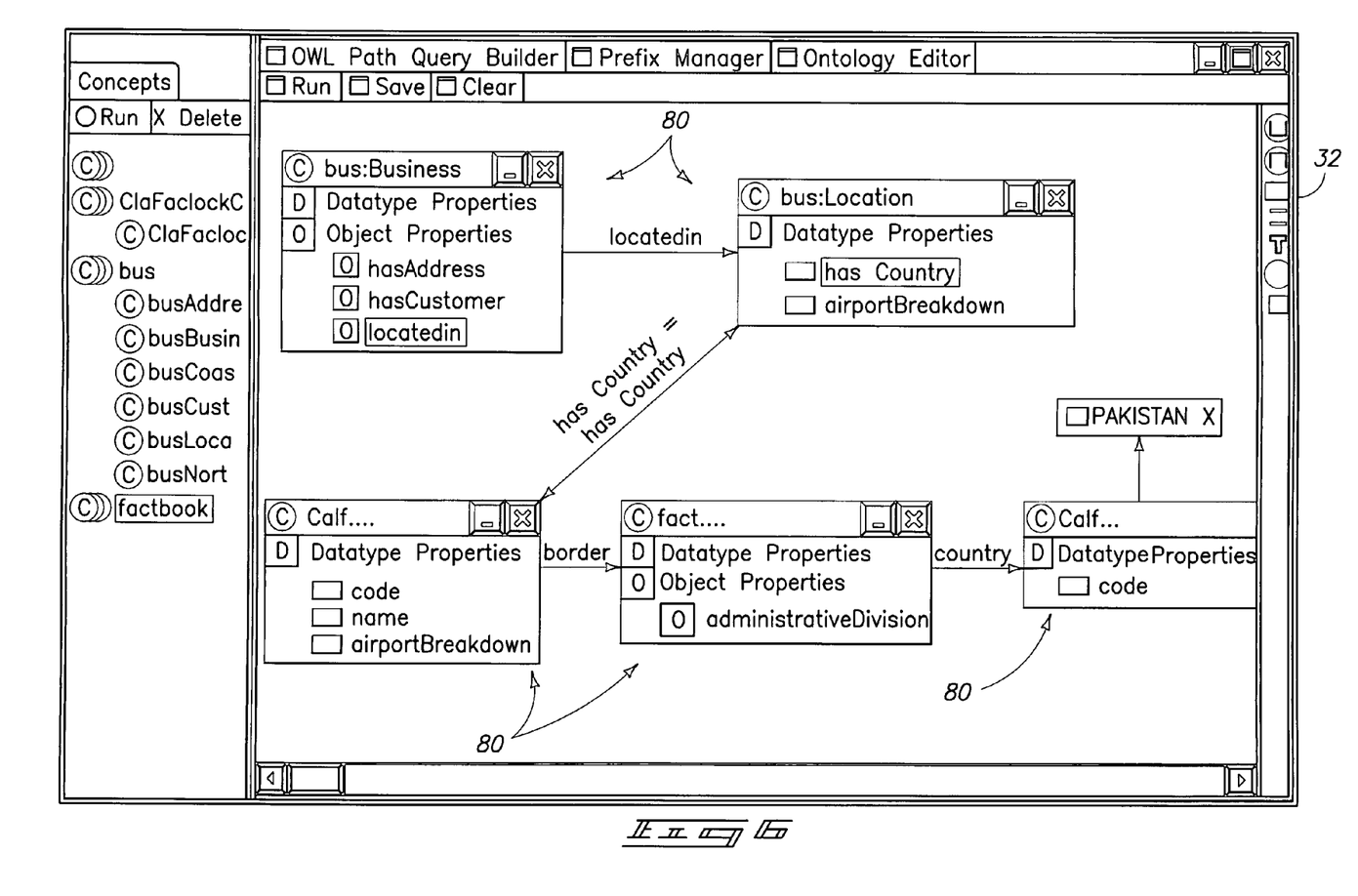
FIG. 6 is an illustrative representation of a screen display illustrating an exemplary search tool according to one embodiment.

Referring again to FIG. 3, at a step S52, a user may interact with the data in additional ways for example by searching the selected documents for useful information. For example, a user may formulate a search query string in an attempt to identify relevant documents of the selected subset. Referring to FIG. 6, an exemplary shot of screen display 32 for assisting a user with formulating a search query string is shown. In the depicted example of FIG. 6, a user utilizes a graphical query tool to search the subset of data for specific data. The user may access a plurality of windows 80 to formulate a query for a subject of interest. Individual ones of the windows 80 may include a hierarchy of predefined items which may be of interest for assisting a search. A user may select the predefined terms to formulate the search. In the example depicted by FIG. 6, a user is querying for businesses located in countries bordering Pakistan. Following creation of the search query, the subset of data selected by the user in step S44 is searched using the search query and the results may be processed to provide the data in structured representations for example similar to the triples shown in FIG. 5. The searching by query of step S52 may augment or be used instead of the topicality event searching discussed with respect to event group window 62 in one embodiment. As illustrated by step S52a, a user may iteratively use search tools to search for additional evidence at different points in time during analysis of a hypothesis. In one example, some evidence determined and perhaps associated with a hypothesis within screen 33 may lead a user to use a query tool to search for additional related evidence.

Providing the data to be processed as structured or annotated representations of text as well as the described exemplary disambiguation of step S112 of FIG. 4 facilitates semantic searching in one embodiment. For example, searching by concepts such as relationships of object, subject and predicate may be implemented as opposed to mere key word searching. Semantic searching may permit analysis of events encoded as triples with respect to the hypotheses being analyzed according to one embodiment. Queries may be formulated enabling searching by people, actions of people, and relationships in some examples.

A user may interact with the evidence at a step S54 of FIG. 3 and perhaps manipulate some of the structured representations. The interaction may include visual manipulation of information and relationships of the structured representations. For example, a user may associate audio files, video files, photographic files, or other information with the structured representations. In one embodiment, the user may replace a node of a structured representation with a file of other evidence. In but one example, a user may replace a name of an individual with the photograph of the individual. The user may manipulate text and graphical data from multiple sources (e.g., documents) to generate a window of increased coherence of the data. The user may discover relationships and reach logical conclusions.

Still referring to FIG. 3, the user may construct a hypothesis at a step S60. For example, referring to FIG. 7, a user may use screen 33 to formulate one or more hypotheses 90a, 90b and the hypotheses may be competing in one embodiment. In an illustrative example, a first hypothesis 90a may consider a soap factory to be a concealed military vehicle depot and a second hypothesis 90b may consider a soap factory to be a legitimate soap production facility. In one embodiment, a user may construct the hypothesis in the form of a tree.

At a step S62, a user may use evidence uncovered during interaction with the data via screens 31 and 32 to analyze the hypothesis. A user may interact with screens 31, 32 to select one or more piece of evidence and to associate selected evidence with appropriate ones of the hypotheses 90a, 90b as described in the exemplary configuration below.

In the exemplary embodiment of FIG. 7, a user may define, construct and associate a plurality of indicators 92a-92d with one or more of the hypotheses 90a, 90b. Indicators 92a-92d individually describe a class of evidence with respect to the respective hypotheses and which may at least one of support and refute the hypotheses. Furthermore, the user may associate individual pieces of evidence 94a-94f with one or more of the indicators 92a-92d and corresponding to the respective classes of evidence. Hypotheses 90, respective indicators 92 and evidence 94 may be arranged in a hierarchical form as shown in one embodiment.

A user may create indicators 92a-92d based upon information or data observed in screens 31, 32 and individual ones of the indicators 92a-92d may be associated with one or both of hypotheses 90a, 90b. Items of evidence 94a-94f can be of any modality and may be associated with appropriate indicators 92a-92d by a user. In illustrative examples, a user may connect items of evidence 94a-94f with indicators 92a-92d using a graphical query tool, by dragging evidence from one of screens 31, 32 or by creating a window and typing text.

Referring to step S64 of FIG. 3 and as further illustrated in FIG. 7, a plurality of weights 96a-96e may be assigned to respective associations of indicators 92a-92d with hypotheses 90a, 90b, and weights 98a-98f may be assigned to respective associations of items of evidence 94a-94e with respective indicators 92a-92d in the exemplary illustrated embodiment. A user may define the values of weights 96, 98 in one embodiment. Weights 96, 98 may be used by processing circuitry 14 to calculate information regarding the accuracy of a respective hypothesis 90a, 90b. In some embodiments, the processing circuitry 14 provides the information for a respective hypothesis in the form of a probability percentage. Additional details of weights 96a-96e and weights 98a-98f are discussed below with respect to FIGS. 8 and 9, respectively.

Figure 8:
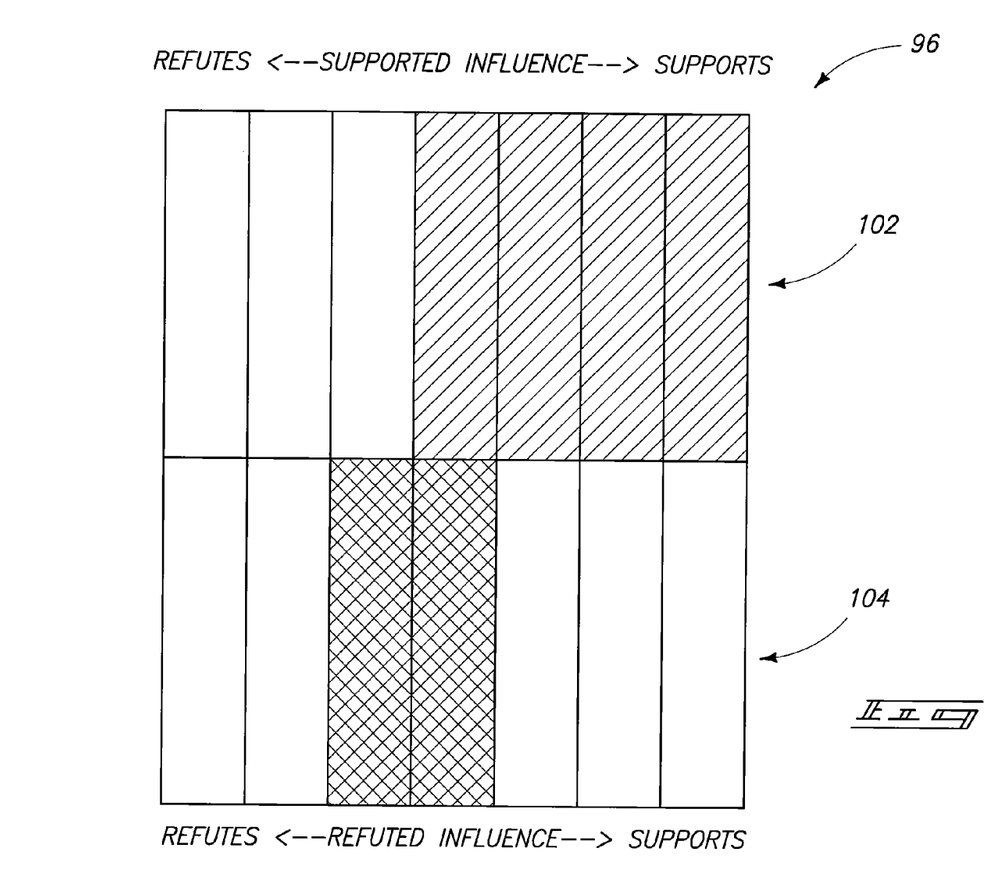
FIG. 8 is an illustrative representation of a weighting of an indicator with respect to a hypothesis according to one embodiment.
Figure 11:
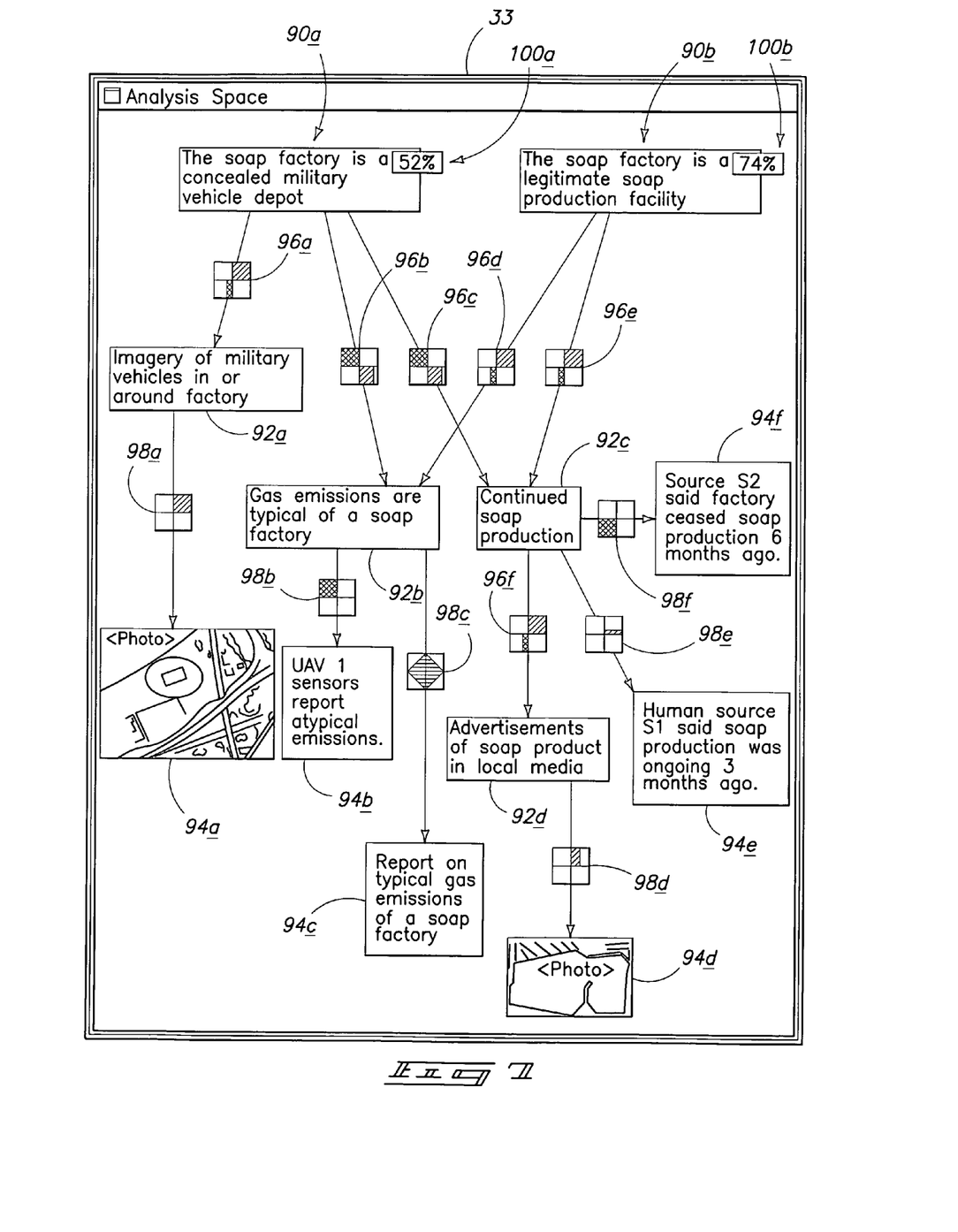

In FIG. 8, an exemplary weight 96 according to a format of one embodiment is shown. The weight 96 of FIG. 8 includes plural weighting regions 102, 104. Weighting region 102 may correspond to a "supported influence" indicative of the strength of the respective indicator as supporting the hypothesis while region 104 may correspond to a "refuted influence" indicative of the strength of the respective indicator as refuting the hypothesis or another indicator as shown in FIG. 7 at 96f. The weighting indicates the strength of the indicator as supporting and refuting a hypothesis or another indicator along the x axis and using regions 102, 104. As shown in FIG. 7, an individual one of the indicators (e.g., 92b) may be associated with a plurality of hypotheses. In one embodiment, the weighting regions 102 and 104 in FIG. 8 are partitioned into seven sub-regions, e.g. corresponding to the values "strongly refutes", "refutes", "weakly refutes", "neither refutes nor supports", "weakly supports", "supports", "strongly supports", going from left to right. Other types of psychometric scales such as the Likert scale (http://en.wikipedia.org/wiki/Likert_scale, the teachings of which are incorporated herein by reference) can be used as alternative weighting schemes.

In FIG. 9, an exemplary weight 98 according to a format of one possible implementation is shown. Weight 98 depicts weighting of evidence with respect to both x and y axes. In the depicted exemplary embodiment, strength of an item of evidence with respect to supporting (+) or refuting (−) a respective indicator is depicted on the x axis while the confidence of the item of evidence is depicted on the y axis (+ being highly confident ranging to − being less confident). An item of evidence which supports an indicator will have a higher positive strength weighting compared with an item of evidence which refutes an indicator and vice versa. The strength and confidence weighting scales of the exemplary embodiment of FIG. 9 are partitioned into seven sub-regions, e.g. corresponding to the values "very weak/doubtful", "weak/doubtful", "somewhat weak/doubtful", "neither weak/doubtful nor strong/confident", "somewhat strong/confident", "strong/confident", "very strong/confident", going from left to right. Other types of psychometric scales such as the Likert scale (http:// en.wikipedia.org/wiki/Likert_scale) can be used as alternative weighting schemes for both strength and confidence.

Also, with respect to the y axis of a weighting 98, the confidence of the item of evidence may be indicated with respect to the reliability of the accuracy of the evidence. For example, the y axis may indicate the evidence as being trustworthy with a relatively high positive confidence value compared with items of evidence which are either unknown as to reliability or resulting from less trustworthy sources. For example, if the provenance of an item of evidence is a government agency or respected publication, the item of evidence may have a higher confidence rating compared with an item from an Internet blog site.

In some embodiments, a user may define values of weights 96, 98 associated with an item of evidence and the respective indicator or an indicator and the respective hypothesis. For example, the user may have personal experience or knowledge regarding an item of evidence and wish to assign the weighting values for one or both of the strength and confidence. Similarly, a user may wish to weight the associations of an indicator with the respective hypothesis using personal experience or knowledge.

In other embodiments, the processing circuitry 14 may automatically assign one or more of the weighting values of weights 96, 98. For example, in one embodiment, the processing circuitry 14 may access information regarding a source of the item of evidence when the item of evidence is associated with one or more of the hypotheses. The processing circuitry 14 may access a database (e.g., stored within storage circuitry 16) and compare the source with known entries of the database. For example, the database may include confidence weighting values for respective different sources of evidence. If the source is found in the database, the processing circuitry 14 may automatically assign a confidence weighting value from the database in weight 98 without user input.

As shown in step S66 of FIG. 3 and referring again to FIG. 7, processing circuitry 14 may provide information regarding the accuracy of the hypotheses 90*a*, 90*b*. In the described embodiment, processing circuitry 14 may provide the information regarding the accuracy in the form of probability percentages 100*a*, 100*b* which may be displayed to a user. In the depicted exemplary embodiment, processing circuitry 14 has calculated probability percentages 100*a*, 100*b* of 52% and 74%, respectively for hypotheses 90*a*, 90*b*. The probability percentages 100*a*, 100*b* indicate the probabilities that the proposed respective hypotheses 90*a*, 90*b* are accurate.

In one embodiment, a mathematical model may be used to produce probabilities that a hypothesis is correct. The mathematical model may use values of the relationships of the evidence and indicators indicated by respective weights 96, 98 in one configuration. More specifically, processing circuitry 14 may utilize the weights 96, 98 associated with the respective hypotheses 90*a*, 90*b* to determine the respective probabilities of the accuracies of the hypotheses 90*a*, 90*b*. In one embodiment, processing circuitry 14 transforms the weights 96, 98 to numerical representations which may be used in calculations for determining the information regarding the accuracy of the hypotheses 90*a*, 90*b*. In one configuration, Bayesian nets may be utilized by processing circuitry 14 to calculate the probabilities using the numerical representations and without user input.

In one embodiment, the network of weights and evidence, indicator and hypothesis nodes in FIG. 7 can be processed using Bayesian network techniques (F. V. Jensen. *Bayesian Networks and Decision Graphs*. Springer. 2001. the teachings of which are incorporated herein by reference) to compute the probabilities of hypothesis nodes of interest in the following way: (1) turn weights into probabilities, e.g. in a psychometric scale comprising seven partitions as the one exemplified at paragraphs [0057] and [0058] where the minimum weight corresponds to the probability 0.142 ($\frac{1}{7}$) and the maximum weight corresponds to the probability 1 ($\frac{7}{7}$); (2) coalesce the strength and confidence weights associated with evidence nodes by multiplying their corresponding probabilities, (e.g. the coalesced strength and confidence weights for 98*a* in FIG. 7 will be equal to 1*0.142 since 98*a* has maximum confidence (probability=1) and minimum strength (probability=0.142)); and (3) choose the upper or lower region of the weight for an indicator according to the coalesced strength and confidence of the weight for the evidence node supporting the indicator, (e.g. if the coalesced strength and confidence of the evidence is less than 0.5 as in 98*a* in FIG. 7, then choose the lower region of the indicator weight and otherwise choose the upper region (therefore, in FIG. 7 the lower region of the weight 96*b* for indicator 92*b* will be chosen, as the coalesced weight 98*a* for the evidence node 94*b* supporting the indicator 92*b* corresponds to a probability value less than 0.5, as explained above in (2)). The network in FIG. 7 can now be processed as a Bayesian network in one embodiment, where evidence weights for strength and confidence expressed as probabilities encode the probability of the indicators which depend on them, and the indicator weights for strength expressed as probabilities encode the probability of the indicators or hypotheses which depend on them. For example, if hypothesis 90*a* in FIG. 7 were only dependent on the indicator 92*a*, the joint probability of 90*a* and 92*a* could then be computed as $P(90a,92a)=P(92a) \times P(90a|92a)$, where $P(92a)$ is equal to the probability equivalent of the coalesced strength and confidence weights in 98*a* and $P(90a|92a)$ is equal to the probability equivalent of the indicator weight in 96*a*. Other embodiments for calculating the probability percentages are possible.

An analyst may observe the probabilities determined by the existing hypotheses 90*a*, 90*b* and modify the hypotheses 90*a*, 90*b* as desired. For example, additional evidence and/or indicators may be added, new hypotheses created, weights adjusted, or any other modification may be made as deemed appropriate by the user.

Referring to step S68 of FIG. 3, analysis device 10 may output a final report, for example, after a hypothesis has been formulated, analyzed and probability of the accuracy calculated. The output may be a plain image, text outline and/or workspace itself stored in an XML format in illustrative examples. The output may be stored in a database in some implementations for future use.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A computer-implemented hypothesis analysis method comprising:
   accessing an indicator which at least one of supports and refutes a hypothesis, wherein the indicator defines one of a plurality of different classifications of evidence with respect to the hypothesis;
   using the indicator, associating evidence of the one of the classifications with the hypothesis;
   weighting the association of the evidence with the hypothesis;
   using the weighting, providing information regarding the accuracy of the hypothesis; and
   wherein the associating comprises creating a first association of the evidence with the indicator and a second association of the indicator with the hypothesis, and wherein the weighting comprises first weighting the first association of the evidence with the indicator using a first type of weight and second weighting the second association of the indicator with the hypothesis using a second type of weight, and wherein the first and second types of weightings are different.

2. The method of claim 1 wherein the evidence one of supports and refutes the indicator.

3. The method of claim 1 wherein the weighting comprises weighting responsive to user input.

4. The method of claim 1 wherein the weighting comprises automatically weighting using processing circuitry.

5. The method of claim 4 wherein the automatically weighting comprises automatically weighting using the processing circuitry in the absence of user input regarding the weighting.

6. The method of claim 1 wherein the first weighting indicates the strength of the evidence with respect to one of supporting and refuting the indicator.

7. The method of claim 1 wherein the weighting indicates the reliability of the accuracy of the evidence.

8. The method of claim 7 further comprising, using processing circuitry, automatically determining the reliability of the accuracy of the evidence in the absence of user input regarding the reliability of the accuracy of the evidence.

9. The method of claim 7 further comprising controlling a display to depict an image including the hypothesis, the indicator, and the weighting including the indication of the reliability of the accuracy of the evidence.

10. The method of claim 7 wherein the determining comprises processing previously stored information regarding trustworthiness of a source of the evidence using the processing circuitry.

11. The method of claim 1 wherein the providing information regarding the accuracy of the hypothesis comprises providing the information automatically using processing circuitry.

12. The method of claim 11 wherein the providing information comprises generating the information which indicates a probability that the hypothesis is correct using the processing circuitry in the absence of user input regarding the probability that the hypothesis is correct.

13. The method of claim 1 further comprising displaying a hierarchy of the hypothesis and the evidence.

14. The method of claim 1 further comprising:
   using processing circuitry, providing a plurality of plain text documents in the form of structured representations; and
   selecting the evidence using the structured representations.

15. The method of claim 14 wherein the providing the plain text documents in the form of structured representations comprises providing the plain text documents in a plurality of respective link node graphs which individually include a subject, predicate and object for an individual one of the plain text documents.

16. The method of claim 1 wherein the indicator refutes and supports the hypothesis.

17. The method of claim 1 wherein the associating comprises associating the evidence which one of supports and refutes the indicator.

18. The method of claim 1 wherein the associating comprises associating the evidence which one of supports and refutes the hypothesis.

19. The method of claim 1 wherein the associating comprises associating the evidence which one of supports and refutes the hypothesis and one of supports and refutes the indicator.

20. The method of claim 1 wherein the accessing comprises accessing the indicator comprising textual content.

21. The method of claim 1 wherein the hypothesis comprises one hypothesis, and the associating comprises associating the evidence with another hypothesis using the indicator.

22. The method of claim 21 wherein the associating comprises simultaneously associating the evidence with the one and the another hypotheses using the indicator, and further comprising providing information regarding the accuracy of the another hypothesis using the association of the evidence with the another hypothesis using the indicator.

23. The method of claim 1 wherein the weighting comprises weighting to indicate one of a plurality of extents to which the evidence one of supports and refutes the hypothesis.

24. The method of claim 1 wherein the weighting comprises weighting to indicate a level of trustworthiness of a source of-the evidence.

25. The method of claim 1 wherein the accessing comprises accessing the indicator which refutes the hypothesis.

26. The method of claim 1 wherein the first weighting comprises providing a strength value which indicates a strength of the evidence supporting or refuting the indicator and a confidence value which indicates a reliability of accuracy of the evidence.

27. The method of claim 26 where the confidence value indicates trustworthiness of a source of the evidence.

28. The method of claim 26 wherein the providing information regarding the accuracy of the hypothesis comprises processing the confidence value using processing circuitry in the absence of user input regarding the confidence value.

29. A hypothesis analysis device comprising:
   processing circuitry configured to:
      access an indicator which at least one of supports and refutes a hypothesis, wherein the indicator defines one of a plurality of different classifications of evidence with respect to the hypothesis;
      use the indicator to associate evidence of the one of the classifications with the hypothesis comprising creating a first association of the evidence with the indicator and a second association of the indicator with the hypothesis;

weight the association of the evidence with the hypothesis comprising first weighting the first association of the evidence with the indicator using a first type of weight and second weighting the second association of the indicator with the hypothesis using a second type of weight, and wherein the first and second types of weightings are different; and use the weighting of the association of the evidence with the hypothesis to provide information regarding the accuracy of the hypothesis.

30. An article of manufacture comprising:

processor-usable media configured to store programming which causes processing circuitry to perform processing comprising:

accessing an indicator which at least one of supports and refutes a hypothesis, wherein the indicator defines one of a plurality of different classifications of evidence with respect to the hypothesis;

using the indicator, associating evidence of the one of the classifications with the hypothesis;

weighting the association of the evidence with the hypothesis;

using the weighting, providing information regarding the accuracy of the hypothesis; and wherein the associating comprises creating a first association of the evidence with the indicator and a second association of the indicator with the hypothesis, and wherein the weighting comprises first weighting the first association of the evidence with the indicator using a first type of weight and second weighting the second association of the indicator with the hypothesis using a second type of weight, and wherein the first and second types of weightings are different.

* * * * *